March 23, 1926.
N. I. TRUDELL
1,578,109
GAS VALVE COCK
Filed August 10, 1925
Fig. 1.
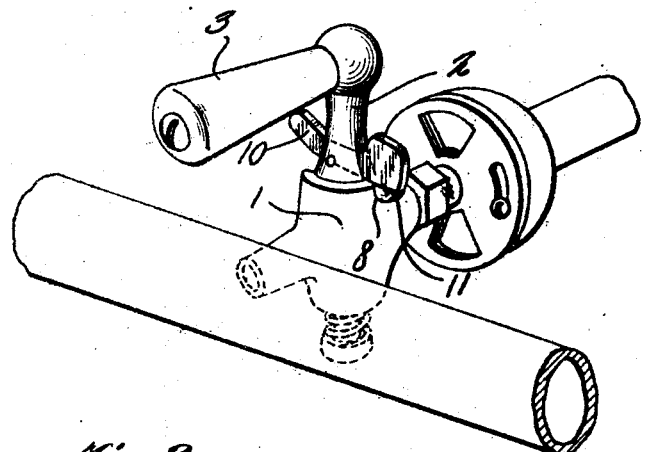
Fig. 2.
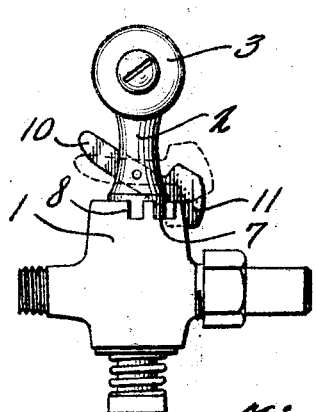
Fig. 3.
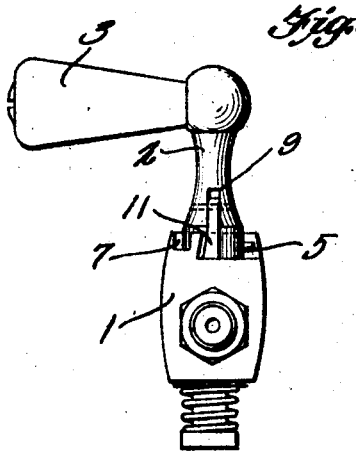
Fig. 4.
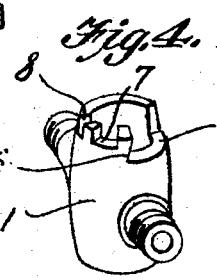
Fig. 5.
Napoleon I. Trudell, INVENTOR
BY Victor J. Evans ATTORNEY
WITNESS: P. E. Hickey Patented Mar. 23, 1926.

1,578,109

UNITED STATES PATENT OFFICE.

NAPOLEON I. TRUDELL, OF BURLINGTON, VERMONT.

GAS VALVE COCK.

Application filed August 10, 1925. Serial No. 49,413.

*To all whom it may concern:*

Be it known that I, NAPOLEON I. TRUDELL, a citizen of the United States, residing at Burlingon, in the county of Chittenden and State of Vermont, have invented new and useful Improvements in Gas Valve Cocks, of which the following is a specification.

My present invention has reference to a gas cock, and my object is the provision of such an article with a simple means for preventing the free or accidental turning of the plug when the gas is shut off, to hold the plug in a position whereby approximately one-half or less of the gas flow is permitted to pass therethrough and to hold the plug in fully open position.

To the attainment of the foregoing the improvement resides in the construction, combination and operative association of parts, a satisfactory embodiment of which is herein set forth.

In the drawings:

Figure 1 is a perspective view of a gas cock in accordance with this invention.

Figure 2 is a side elevation thereof.

Figure 3 is an end elevation thereof.

Figure 4 is a perspective view of the body of the cock.

Figure 5 is a similar view of the locking lever.

The body 1 of the gas cock is of the usual construction as is the core. In the showing of the drawings the gas cock is of the type employed in connection with gas burning stoves but of course the invention is not to be restricted to this particular class of cocks. The plug 2 is provided with the usual operating handle 3. In carrying out my invention I notch the upper end of the body 1, at the rear thereof, to provide a comparatively wide opening 4 therein. The plug 2 is provided with the usual stop pin 5 to contact with one of the end walls formed by the opening 4 and the opposite end wall provided by the said opening is beveled, as at 6. On one side of the body at the said upper end thereof, at a slight distance from the opening 4, there is a notch 7, and outward of said notch 7 there is a second notch 8.

The notch 7 is of a slightly greater width than that of the notch 8.

Also in carrying out my invention I centrally form the plug with a transverse opening 9, and in this opening I pivot the handle end of a locking lever 10. The active end of the locking lever is formed with a lug or projection that provides the same with a dog 11, and the inner face of this dog is beveled and arranged at an angle.

When the plug is turned to close the passage therethrough the dog end of the lever is received in the opening 4, and the angle or beveled face of the dog 11 will contact with the angle end wall 6 provided by the opening 4. The dog end of the lever is of course weighted so that the dog will simply gravitate into the said opening 4. A decided push must be exerted on the lever to bring the dog end thereof out of engagement with the wall 6. Thus a small child cannot actuate the locking lever. When the lever is swung to bring the dog to inactive position and the handle 3 is turned so that the dog 11 is brought opposite the notch 7 the dog will automatically drop into said notch. When the plug is in this position approximately one-half of the regular flow of gas is permitted to pass through the gas cock. Should the handle be turned in the direction for shutting off the cock, the straight face of the dog will contact with the inner wall of the comparatively wide notch 7, which will reduce the flow of gas through the cock but not sufficiently to extinguish the flame. Thus when the dog is in the notch 7 the flame may be regulated to a nicety. When a full flow of gas is desired the dog is raised from the notch 7 and the handle turned to permit of the dog dropping into the notch 8.

The simplicity of the construction and the advantages thereof will, it is believed be perfectly apparent when the foregoing description is read in connection with the accompanying drawings.

Having described the invention, I claim:—

A gas cock including a body, a spring influenced plug and a handle for the plug, said body having its upper end provided with a comparatively wide slot, one wall of which is beveled, the plug having a stop pin for contacting with the opposite wall of the slot when the cock is shut off, the said end of the body having two spaced notches, the inner notch being of a greater width than the outer notch, said plug having a transverse opening therethrough, a locking lever passing through the opening and pivoted to the plug, said locking lever having a weighted depending dog end, and one side of said dog being beveled, all as and for the purpose set forth.

In testimony whereof I affix my signature.

NAPOLEON I. TRUDELL.